(12) United States Patent
Liedtke et al.

(10) Patent No.: US 6,814,125 B1
(45) Date of Patent: Nov. 9, 2004

(54) APPARATUS FOR JOINING SUBSTRATES TOGETHER

(75) Inventors: Björn Liedtke, Munich (DE); Joachim Gordt, Sternenfels (DE); Ulrich Speer, Elsingen (DE); James Wise, Sternenfels (DE); Hans Gerd Esser, Bretten (DE)

(73) Assignee: STEAG HamaTech AG (DE)

( * ) Notice: Subject to any disclaimer, the term of this patent is extended or adjusted under 35 U.S.C. 154(b) by 182 days.

(21) Appl. No.: 10/018,145

(22) PCT Filed: Jun. 14, 2000

(86) PCT No.: PCT/EP00/05440

§ 371 (c)(1),
(2), (4) Date: Dec. 14, 2001

(87) PCT Pub. No.: WO00/76752

PCT Pub. Date: Dec. 21, 2000

(30) Foreign Application Priority Data

Jun. 16, 1999 (DE) .......................... 199 27 514

(51) Int. Cl.⁷ .............................................. B32B 35/00
(52) U.S. Cl. .......................... 156/539; 156/556; 269/53; 29/238; 29/281.6
(58) Field of Search ................................. 156/538, 539, 156/556; 269/53, 54; 29/238, 281.5, 281.6

(56) References Cited

U.S. PATENT DOCUMENTS 2,705,968 A    4/1955  Mazzeo
3,892,415 A  * 7/1975  Takahashi et al. .......... 369/209
4,701,896 A   10/1987  Allebest et al.
4,704,181 A   11/1987  Kubo
4,768,185 A    8/1988  Camerik
5,197,056 A    3/1993  Van Heusden et al.
5,888,433 A    3/1999  Amo
6,179,031 B1 * 1/2001  Rack et al. .................. 156/538

FOREIGN PATENT DOCUMENTS

EP    0 793 224 A1    9/1997
JP    64-052238    *  2/1989    ............ G11B/7/26

OTHER PUBLICATIONS

JP 64–052238 Patent abstracts of Japan Feb. 28, 1989.*
JP 01052238 Patent Abstracts of Japan Aug. 24, 1987.
JP 11053769 Patent Abstracts of Japan Aug. 1, 1997.
JP 03157834 Patent Abstracts of Japan Nov. 16, 1989.
JP 09245386 Patent Abstracts of Japan Mar. 7, 1996.

* cited by examiner

Primary Examiner—Sue A. Purvis
Assistant Examiner—Sing P Chan
(74) Attorney, Agent, or Firm—R W Becker & Associates; Robert W Becker

(57) ABSTRACT

An apparatus is provided for joining together at least two substrates, each of which has an inner hole. The apparatus has a pin that is adapted to the inner holes of the substrates. The pin is provided with at least two noses that are movable radially relative to the pin. The noses have linear outer surfaces upon which the edges of the inner holes of the substrates can glide downwardly during movement of the noses toward the pin.

23 Claims, 5 Drawing Sheets

70

APPARATUS FOR JOINING SUBSTRATES TOGETHER

BACKGROUND OF THE INVENTION

The present invention relates to an apparatus for joining together at least two substrates, each of which has an inner hole, with the apparatus having a pin that is adapted to the inner holes of the substrates.

Many data carriers, such as DVD's, are generally comprised of two substrates that are glued together and that for the gluing are joined together in a centered manner. In so doing, generally a first substrate that is provided with an adhesive coating is placed upon a planar support and subsequently a second substrate is moved over the first substrate by means of a handling apparatus and hence the substrates are brought together. In this connection, the handling apparatus must not only be in a position to precisely orient these substrates relative to one another, but also to uniformly press the substrates together. However, such a handling apparatus is very complicated and expensive, and is susceptible to disruptions, which leads to irregularities during the joining together and adversely affects the functioning of the data carrier and can even make it unusable.

U.S. Pat. No. 5,888,433 discloses an apparatus of the aforementioned type for joining two substrates together. The apparatus provided with an expandable centering boss that is comprised of three individual parts. The centering boss is introduced into the central hole of a substrate that is comprised of two glued-together substrate halves, and the boss is subsequently radially expanded. Due to the expansion, a centering of the two substrate halves results, after which they are glued together. This subsequent centering has a danger that the substrate halves can be damaged, since the force applied to the substrate halves must be relatively high in order to move the substrates relative to one another after the gluing.

Proceeding from the above-described apparatus, it is an object of the present invention to provide a simple and economical apparatus for joining substrates together, with such apparatus enabling a reliable and precise joining together with a low reject rate.

SUMMARY OF THE INVENTION

Pursuant to the present invention, with an apparatus for joining together at least two substrates, each of which has an inner hole, and which apparatus has a pin that is adapted to the inner holes of the substrates, this object is realized in that the pin has at least two noses that are movable radially relative to the pin, wherein the edges of the inner holes of the substrates glide downwardly on the straight or linear outer surfaces of the noses during movement of the noses toward the pin. The pin makes it possible during the joining together for the substrates to be guided precisely centrally and parallel to one another. In particular, due to the linear outer surfaces of the noses, the substrates are held such that their faces are parallel to one another, and the linear outer surfaces, during the joining together, provide a constant movement sequence. Due to the use of the pin, the requirements made of a handling apparatus can be significantly reduced, so that the costs associated therewith are eliminated.

Pursuant to a particularly preferred specific embodiment of the invention, prior to the joining together, the noses keep the substrates spaced apart, so that they are placed upon the pin and can subsequently be transported into a joining station in which they are joined together. The pin is advantageously a centering pin, that at least in the lower region has an outer periphery that corresponds to the inner periphery of the inner holes of the substrates in order to precisely align the substrates relative to one another.

For a particularly simple and economical embodiment of the invention, the noses are pivotably mounted on the centering pin. The noses are advantageously biased outwardly by at least one biasing unit in order to achieve a controlled joining together of the substrates. In this connection, the biasing unit is preferably provided with at least one spring.

Pursuant to one specific embodiment of the invention, the noses are movable toward the pin by exerting pressure upon the substrates, so that the substrates can be joined together in a controlled manner by a simple exertion of pressure.

Pursuant to an alternative specific embodiment of the invention, an actuating element that radially moves the noses is provided and can control the movement of the noses. For this purpose, the noses are preferably embodied as lever arms in order to enable a simple actuation thereof. The actuating element is advantageously introducible between the noses and has a conical configuration in order to enable a uniform movement of the noses in a simple manner. For a good gliding movement between the noses and the actuating element, the ends of the noses are advantageously rounded off.

Pursuant to a further specific embodiment of the invention, the biasing of the noses can be varied in order to enable a controlled gliding of the substrates along the outer surfaces of the noses. Advantageously, a conical or tapered element disposed in the pin is provided that is movable counter to a biasing. In this connection the tapered element is preferably movable against a spring.

In order to provide a controllable biasing of the noses, a biasing element is preferably provided between the tapered element and the noses. The outwardly directed biasing of the noses is in this connection preferably variable via a movement of the tapered element.

BRIEF DESCRIPTION OF THE DRAWING

Further features, advantages and details of the invention will be explained subsequently with the aid of preferred specific embodiments with reference to the figures, in which.

DESCRIPTION OF PREFERRED EMBODIMENTS

Figure 1:
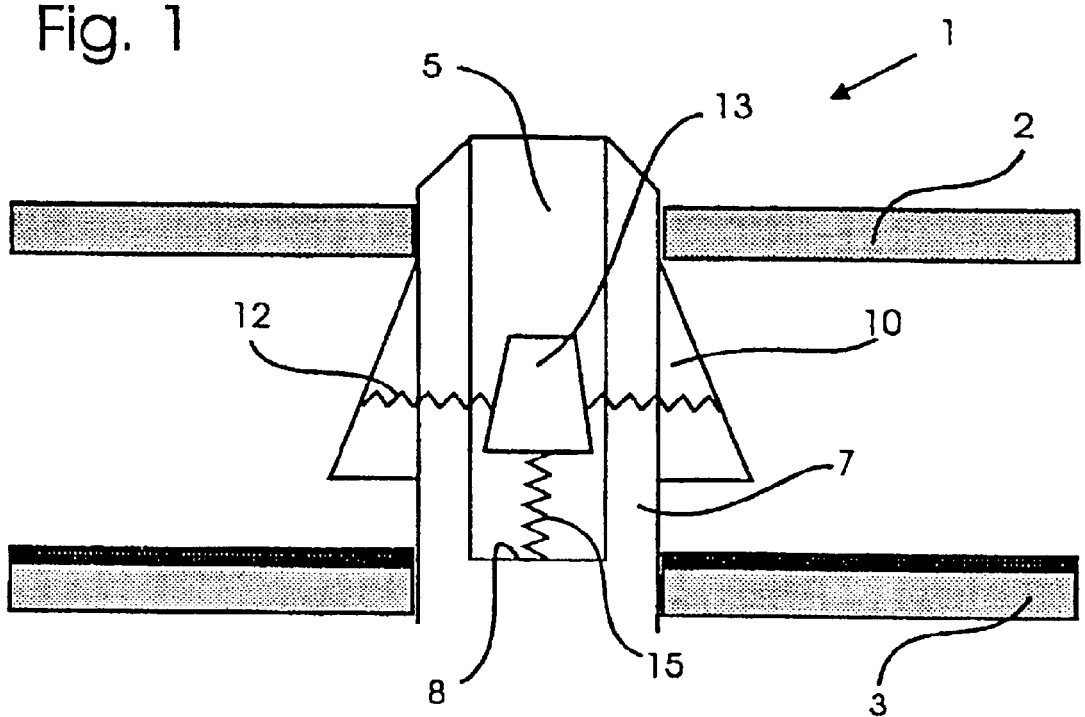
FIG. 1 is a schematic cross-sectional view through a centering pin of the present invention prior to the joining together of two substrates.
Figure 2:
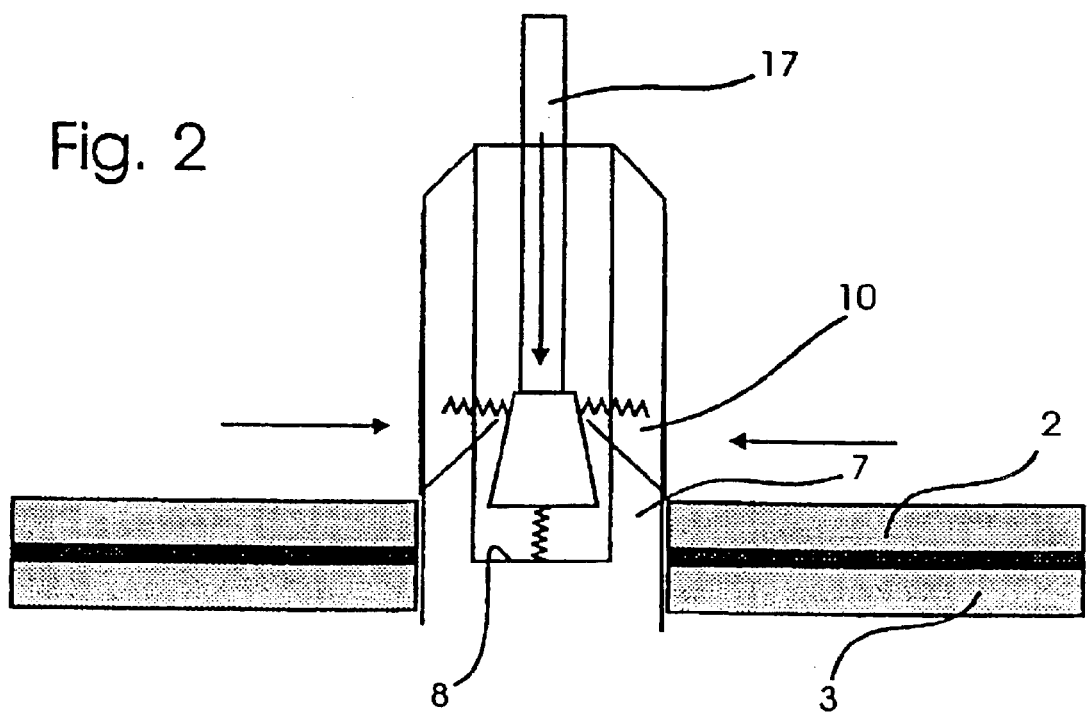
FIG. 2 is a schematic cross-sectional view of the centering pin of FIG. 1 during the joining together of the substrates.
Figure 3:
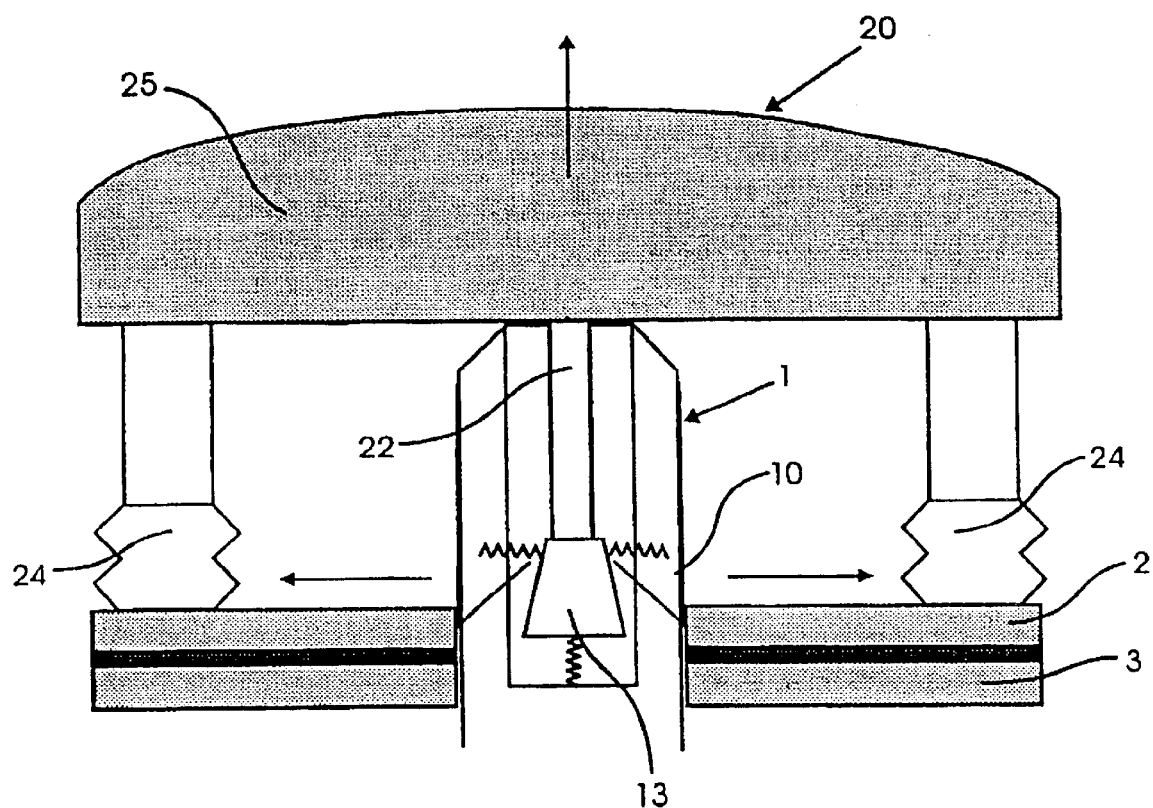
FIG. 3 is a schematic cross-sectional view of the centering pin and a substrate handling apparatus for the removal of the substrates from the pin.

FIGS. 1 to 3 show a first embodiment of a centering and holding pin 1 for receiving substrates 2,3. The pin is accommodated in a non-illustrated receiving means that defines a support for the substrates 2,3. A joining station, in which the pin can be inserted, is shown, for example, in the patent application belonging to this applicant and filed on the same day as the present application and having the title "Apparatus and Method for Producing a Data Carrier"; to avoid repetition, this referenced application is made the subject matter of the present application.

The pin 1 has an upwardly open hollow chamber 5, which is delimited to the side by a side wall 7, and toward the bottom by a base 8 of the pin 1. The outer periphery of the wall 7 is adapted to the shape of the inner or central holes of the substrates 2,3 and in particular in a lower region the pin is provided with a precisely ground outer periphery in order to ensure a good centering and guidance of the two substrates 2,3 relative to one another. The upper end of the wall is beveled, so that it defines an upwardly tapering inclined surface 9. The inclined surface 9 enables a centering and guidance of the substrates when they are received on the pin.

Disposed on the side wall 7 of the pin 1 is a plurality of projections or noses 10, two of which are illustrated in FIGS. 1 to 3. With the presently preferred embodiment, four noses 10 are provided. The noses 10 are pivotably disposed on the wall 7 of the pin 1 in a suitable manner in order to be pivotable between the positions shown in FIGS. 1 and 2.

By means of compression springs 12, the noses 10 are biased radially outwardly away from the pin 1 into the position shown in FIG. 1, as will be described in greater detail subsequently. Provided in the hollow chamber 5 of the pin 1 is a conical or tapered element 3 that tapers upwardly. The tapered element 13 is disposed within the hollow chamber 5 such that it is vertically movable and is biased upwardly via a spring 15 into the position-shown in FIG. 1. One end of the compression springs 12 is supported against the tapered element 13, and the other end of the compression springs is supported against the noses 10 in order to press them outwardly. In so doing, the springs 12 can glide along the conical surface of the tapered element 13, as a result of which the outwardly directed biasing force is altered.

A non-illustrated spring ring or lock washer extends about the lower ends of the noses in order to draw them to the pin 1 into the position shown in FIG. 1. In so doing, the spring constant of the spring ring is so low that it is does not exceed the outwardly directed biasing force exerted by the compression springs 12 as long as the tapered element 13, and hence the inner support of the springs 12, are in the position shown in FIG. 1. If, as shown in FIG. 2, the tapered element 13 is pressed downwardly by a rod 17, the springs 12 glide along the conical surface of the tapered element 13, as a result of which the outwardly directed biasing force of the springs 12 is reduced. In this position, the spring constant of the spring ring is sufficient to draw the noses 10 to the pin 1 into the position shown in FIG. 2.

During the movement of the noses 10 between the position shown in FIG. 1 and the position shown in FIG. 2, the substrate 2 glides along the outer surfaces of the noses 10 in the direction of the substrate 3. In so doing, the linear surfaces of the noses 10 provide a good guidance of the substrate 2 which prevents a tilting or cocking of the substrate. This guidance is maintained during an essentially constant transmission of force until the substrate 2 rests upon the substrate 3.

The rod 17 can be part of a non-illustrated pressure ram that serves for pressing the substrates 2,3 together.

Instead of the above-described arrangement of compression springs 12 for pressing the noses 10 outwardly, and a non-illustrated spring ring for drawing the noses together, it would also be possible for the noses 10 to contact the tapered element 13 directly and to be pressed outwardly by the tapered element 13 in the position shown in FIG. 1. If the tapered element 13 is moved into the position shown in FIG. 2, the noses glide along the conical outer surface of the tapered element 13 and are drawn into the position shown in FIG. 2 by the non-illustrated spring ring. The same effect could also be achieved if the springs 12 shown in FIG. 1 were to be embodied as tension springs.

FIG. 3 shows a substrate handling apparatus 20 for the removal of the joined-together substrates 2,3 from the pin 1. The handling apparatus 20 is provided with a spacer rod 22 for pressing the tapered element 13 down in order, prior to the removal, to move the noses 10 into their retracted position of FIG. 3. The handling apparatus 20 is furthermore provided with vacuum fingers 24, two of which are illustrated in FIG. 3, by means of which the substrates 2,3 are drawn against the handling apparatus 20 and held thereon. The vacuum fingers 24 are displaceable in height relative to the main body 25 of the handling apparatus 20, for example by means of a bellows mechanism, in order to enable a relative movement, in terms of height, between the spacer rod 22 and the vacuum fingers 24.

A specific embodiment of the invention will be described subsequently with the aid of FIGS. 4 to 7, whereby the same reference numerals are used as in FIGS. 1 to 3 to the extent that they relate to the same or similar parts.

Figure 4:
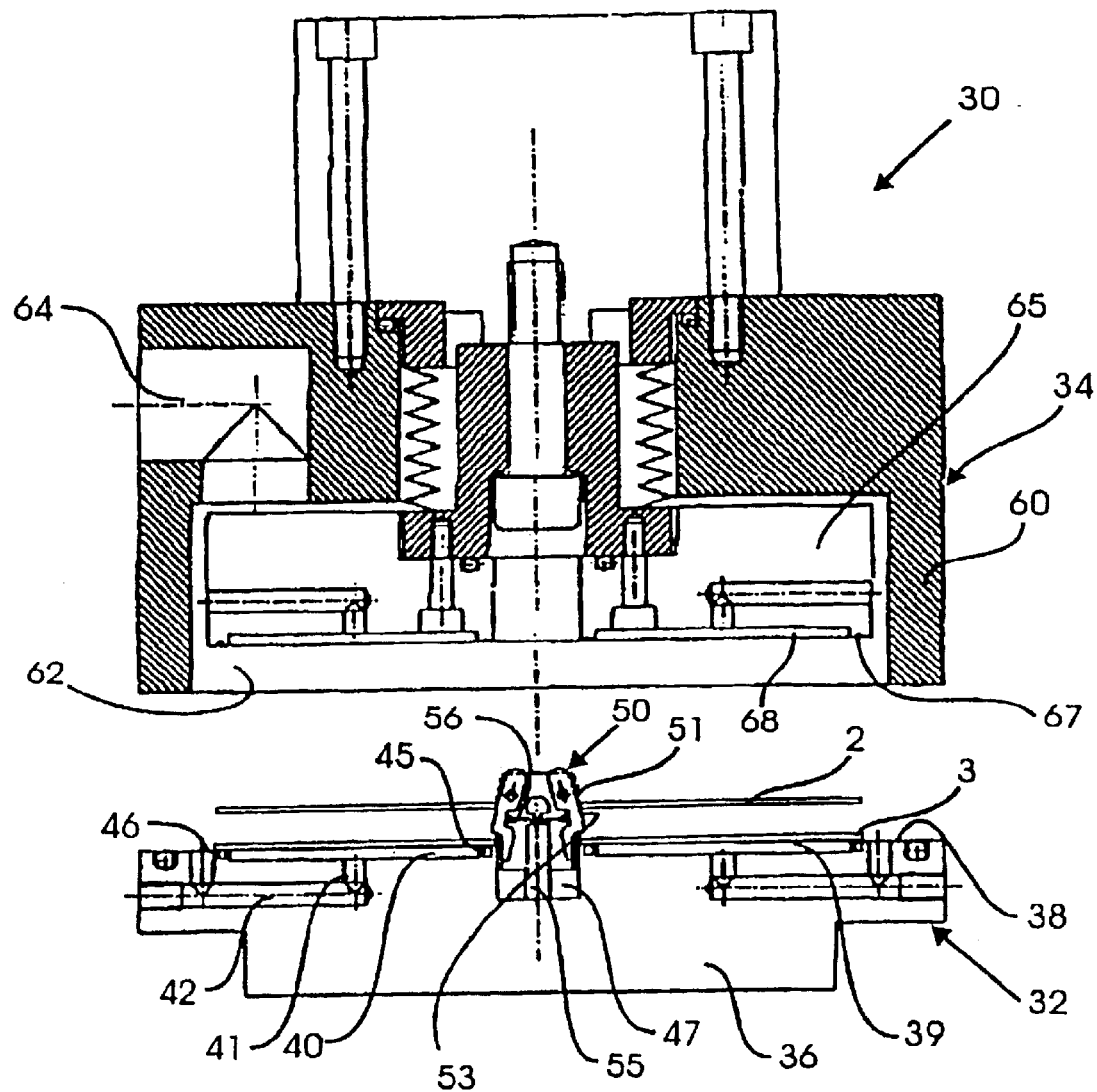
FIG. 4 shows a processing station for the joining together of two substrates, which station contains a centering pin of the present invention and in particular in an opened position.

FIG. 4 shows a processing station 30 for the joining together of substrates 2,3 to form a DVD. The processing station 30 has a support member 32 as well as a processing chamber 34. The support member is essentially formed by a main body 36 that defines a support for the substrate 3. As can be best seen in FIG. 7, the main body 36 has an upwardly directed surface 38 that, in a portion located below the substrate, is provided with a recess 39 in order when the substrate is placed on to form a chamber 40 between the substrate 3 and the main body 36. The chamber 40 is supplied with a pressurized fluid via lines 41, 42 in order during a joining process to exert an upwardly directed pressure against the substrate. By means of O-rings 45,46 disposed in the surface 38, the chamber is sealed off toward the outside, so that during the joining process, no fluid can escape from the chamber.

Formed in the central portion of the surface 38 is a further recess 47 in which a centering and holding pin 50 is accommodated. The pin 50 is provided with projections or noses 51 that are pivotably mounted thereon and that have linear outer surfaces 53. The pin 1 is provided with a shaft or extension 55 that is disposed radially inwardly relative to the noses 51; the extension extends from below between the noses 51 and in particular to the height of the pivotable attachment of the noses. Disposed between the noses and the extension are compression springs 56 that press the noses 51 radially outwardly. In so doing, the noses 51 form a conical shape that widens in a downward direction and upon which a substrate 2 can be placed. By means of the springs 56, the noses are pressed outwardly with an adequate force in order to hold the substrate 2 in the position shown in FIG. 4. In order to join the substrates 2,3 together, a pressure is applied to the substrate 2 from above by means of an apparatus that will be described subsequently; this pressure is sufficient to overcome the spring force and to effect an inward pivoting of the noses 51. In so doing, the substrate 2 glides along the linear outer surfaces 53 of the noses 51 and is precisely guided during the gliding movement, thereby preventing a tilting or cocking of the substrate 2. The substrate 2 is essentially guided until it comes into contact with the substrate 3 and is pressed together therewith.

The processing chamber member 34 has a housing 60 that defines a downwardly open chamber 62. The housing 60 and the support member 32 are movable relative to one another, whereby the housing can be positioned upon the surface 38 of the support member 32 in order to close off the underside of the chamber 62 in the housing 60. The chamber 62 can be vented via a line 64, so that a joining together process of the substrates 2,3 in the vacuum can be effected.

Figure 6:
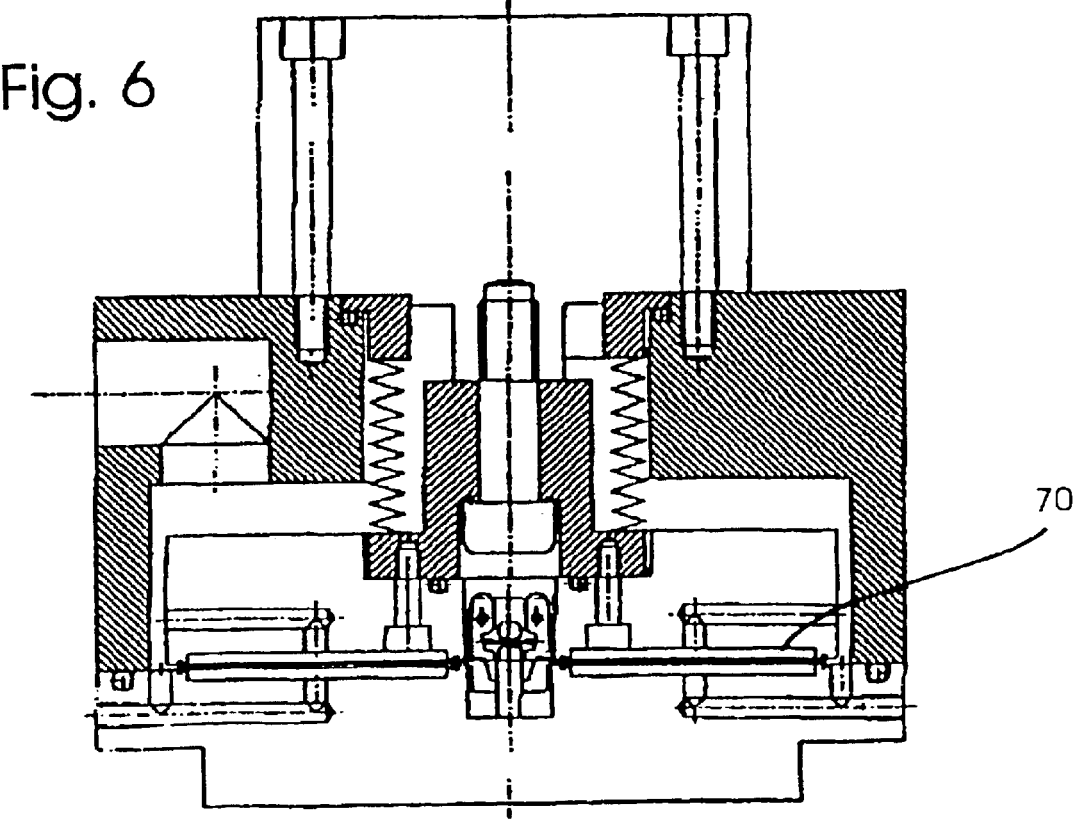
FIG. 6 shows a similar view to that of FIG. 4, whereby the processing station is shown during the joining together of two substrates.

Disposed in the chamber 62 is a movable press or ram 65 that in a downwardly directed surface 67 is provided with a recess 68 in order to form a chamber 70 between the ram 60 and the substrate 2 when the ram 60 is moved into contact with the substrate 2 as shown in FIG. 6. The chamber 70 is sealed off toward the outside and toward the inside by O-rings. In the same manner as the chamber 40, the chamber 70 can be supplied with a fluid in order during a joining process to press the substrate 2 downwardly against the substrate 3. Pressing the substrates together by means of a fluid introduced into the chambers 40,70 provides a uniform surface pressure against the substrates and thus ensures a good joining process.

A joining together of the substrates will now be explained with the aid of FIGS. 4 to 6. As can be seen from FIG. 4, a first substrate 3 is placed upon the surface 38 of the support member 32, and a second substrate is placed upon the noses 51 of the pin 50, as a result of which a defined spacing is maintained between the substrates. The housing 60 of the processing chamber member 34 is spaced from the surface 38 of the support member 32.

Figure 5:
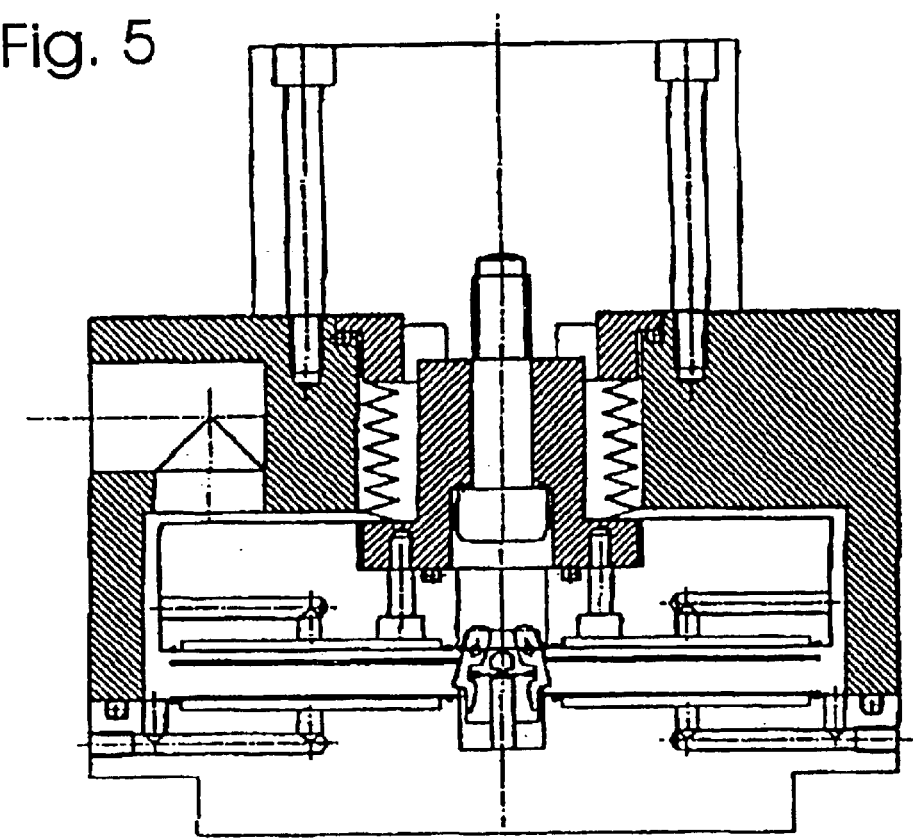
FIG. 5 shows a view similar to that of FIG. 4, whereby the processing station is shown in a closed position prior to the joining together of two substrates.

As shown in FIG. 5, the housing 60 is subsequently positioned upon the surface 38 in order to form a closed processing chamber 62. The processing chamber is now vented via the line 64 in order to carry out the subsequent joining together of the substrates under vacuum conditions. This prevents air pockets or bubbles between the substrates during the joining together.

The ram 65 is lowered until it comes into contact with the substrate 2, and the substrate 2 is then pressed downwardly by the ram 65, which is lowered further. In so doing, the edges of the inner hole of the substrate 2 are guided by the inwardly pivoting noses 51, thereby preventing a tilting of the substrate 2.

As soon as the substrate 2 has been lowered to such an extent that it comes into contact with the substrate 3, in particular with an adhesive layer disposed thereon, as shown in FIG. 6, a pressurized fluid is introduced into the chambers 40,70 in order to press the substrates 2,3 together in a controlled manner.

Instead of the joining together apparatus 30 described above, it is to be understood that another suitable apparatus can also be used in conjunction with the centering and holding pin. One example for another apparatus is described in the patent application that belongs to the same applicant and was filed on the same day and has the title "Apparatus and Method for Producing a Data Carrier", with this application being made the subject matter of the present application in order to avoid repetition.

Figure 7:
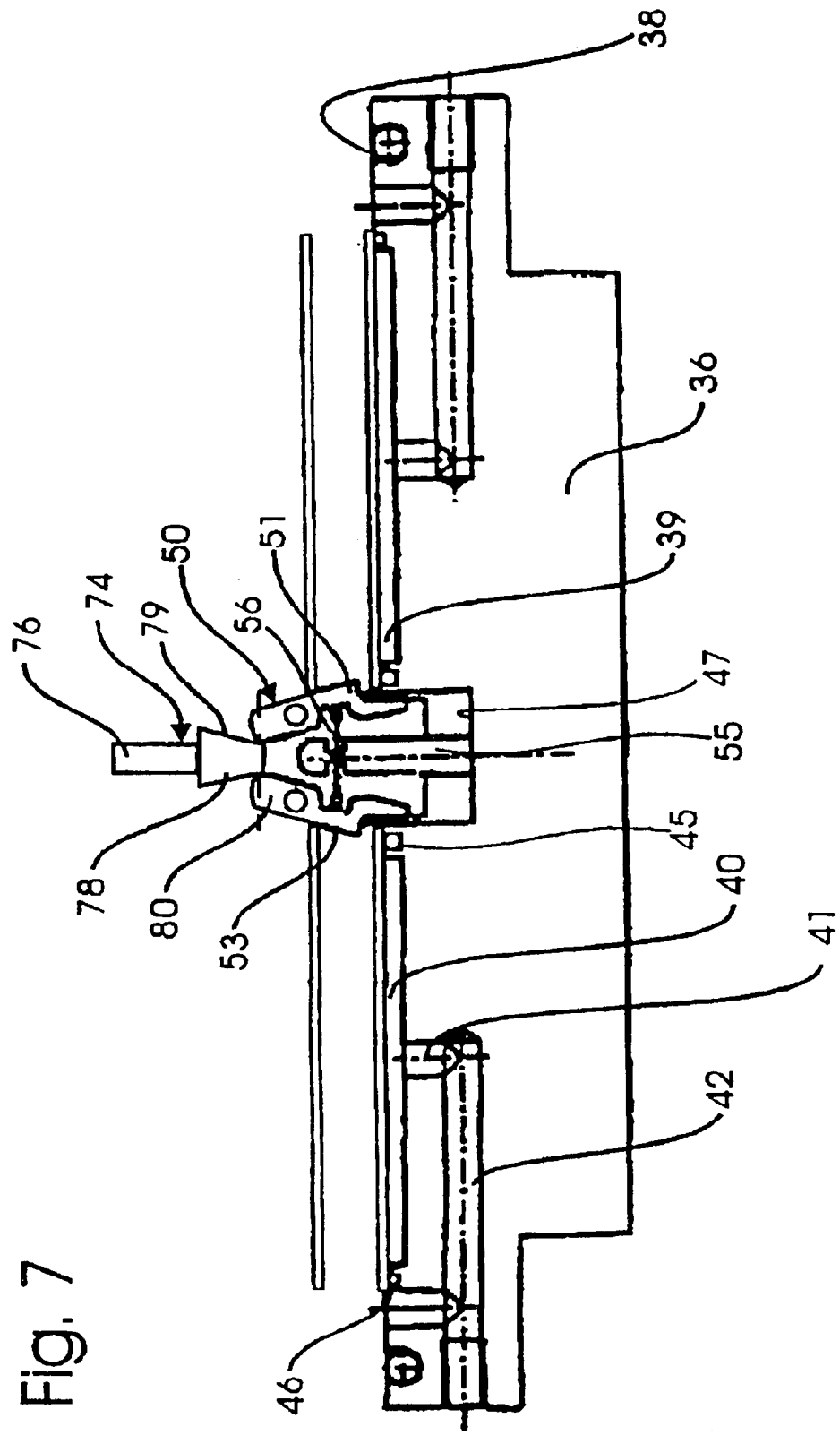
FIG. 7 shows a view similar to that of FIG. 4 of an alternative processing station for the joining together of two substrates.

FIG. 7 shows a support member 32 of a processing station 30 pursuant to FIGS. 4 to 7, whereby in addition an actuating element 74 is shown that is suitable for pivoting the noses 51 of the pin 50. The actuating element 74 is provided with a shaft 76, as well as with a conical or tapered element 78 secured thereon. The shaft 76 and the tapered element 78 can, of course, also be embodied as a single part. The tapered element 78 is provided with downwardly tapering surfaces 79 that can be introduced between the noses 51 of the pin 50, as indicated in FIG. 7. When the tapered element is introduced between the noses 51, it comes into contact with rounded end portions 80 of the noses 51 and presses these noses apart during a further downwardly directed movement of the tapered element 78. As a result, the noses, especially the linear outer surfaces 53, are pressed inwardly in the direction of the pin 50 against the outwardly directed bias of the springs 56. The tapered element can pivot the noses entirely inwardly in order to enable a movement of the substrates along the pin 50.

The actuating element 74 is, for example, associated with the ram 65 of FIGS. 4 to 6 in order to enable a controlled placement of the substrate 2. However, the actuating element 74 can also be associated with a substrate removal unit in order to permit a free removal of the substrates 2,3 from the pin 50 after the joining together.

The invention has been described with the aid of preferred specific embodiments of the invention, without, however, being limited thereto. In particular, the apparatus is usable not only for joining substrates together to form DVD's. The invention can also be used with an apparatus for coating or layering an optical carrier, as described, for example, in the patent application of this applicant that was filed on the same day as the present application and has the title "Apparatus and Method for Coating an Optically Readable Data Carrier". To avoid repetition, this other application is made the subject matter of the present application. Furthermore, the apparatus is also not limited to the joining together of two substrates. Rather, a plurality of substrates can also be joined together sequentially or also essentially simultaneously.

The specification incorporates by reference the disclosure of German priority document 199 27 514.9 filed 16 Jun. 1999 and International priority document PCT/EP00/05440 of Jun. 14, 2000.

The present invention is, of course, in no way restricted to the specific disclosure of the specification and drawings, but also encompasses any modifications within the scope of the appended claims.

What is claimed is:

1. An apparatus for joining together at least two substrates, each of which has an inner hole, said apparatus comprising:
    a pin that is adapted to said inner holes of said substrates, wherein said pin is provided with at least two noses that are movable radially relative to said pin, and
    wherein said at least two noses have linear outer surfaces upon which edges of said inner holes of said substrates can glide downwardly during movement of said noses toward said pin, and wherein said noses guide the downward movement of the substrates.

2. An apparatus according to claim 1, wherein said at least two noses keep said substrates spaced apart prior to a joining together process.

3. An apparatus according to claim 1, wherein said pin is a centering pin.

4. An apparatus according to claim 3, wherein said at least two noses are pivotably mounted on said centering pin.

5. An apparatus according to claim 1, wherein at least one biasing unit is provided for an outward biasing of said at least two noses.

6. An apparatus according to claim 5, wherein said biasing unit is provided with at least one spring.

7. An apparatus according to claim 5, wherein means are provided for varying said biasing of said at least two noses.

8. An apparatus according to claim 5, wherein a tensioning element is provided for drawing said at least two noses inwardly, and wherein said tensioning element has a tensioning force that is not sufficient to overcome a normally outwardly directed biasing force of said at least two noses.

9. An apparatus according to claim 8, wherein when said outwardly directed biasing force of said at least two noses is reduced, said tensioning force of said tensioning element draws said at least two noses inwardly.

10. An apparatus according to claim 8, wherein said tensioning element is a spring ring that is disposed on said at least two noses.

11. An apparatus according to claim 10, wherein said spring ring is disposed on an inner periphery of said at least two noses.

12. An apparatus according to claim 1, wherein means are provided for exerting pressure upon said substrates for effecting movement of said at least two noses toward said pin.

13. An apparatus according to claim 1, wherein an actuating element is provided for radially moving said at least two noses.

14. An apparatus according to claim 13, wherein said actuating element is insertable between said at least two noses.

15. An apparatus according to claim 13, wherein said actuating element has a conical configuration.

16. An apparatus according to claim 13, wherein ends of said at least two noses that face said actuating element are rounded off.

17. An apparatus according to claim 1, wherein said at least two noses are embodied as lever arms.

18. An apparatus according to claim 1, wherein a tapered element is disposed in said pin, and wherein said tapered element is movable counter to a biasing means.

19. An apparatus according to claim 18, wherein said biasing means is a spring.

20. An apparatus according to claim 18, wherein a biasing element is disposed between said tapered element and said at least two noses.

21. An apparatus according to claim 18, wherein an outwardly directed biasing of said at least two noses is variable via a movement of said tapered element.

22. An apparatus according to claim 1, wherein four noses are provided.

23. An apparatus for joining together at least two substrates, each of which has an inner hole, said apparatus comprising:

a pin having an outer diameter less than said inner holes of said substrates such that each of said substrates can freely pass over said pin upon insertion of said substrate onto said pin; and at least two noses, each nose being movable relative to said pin and having an outer surface for sliding engagement therealong of an inner hole edge location of a respective one of said substrates being inserted over said pin, each nose moving radially inwardly as it yieldably resists the downward sliding movement of the respective engaged inner hole edge location of said respective one substrate as said respective one substrate is being inserted over said pin, wherein the downward sliding movement of said respective one substrate along said noses is controlled by the inward movement of said noses relative to said pin and the yielding resistance of each of said noses relative to the other of said noses is such that said respective one substrate remains substantially centered on said pin as said respective one substrate slides along said noses, and the axial lower limits of said outer surfaces of said noses are axially above a lower extent of said pin having a length sufficient for said respective one of said substrates to move downwardly beyond said noses into a position on top of an already fully inserted substrate disposed therebelow; and means for biasing said noses radially outwardly from said pin such that said noses immediately engage said respective one substrate as said one respective substrate moves downwardly along said pin.

* * * * *